United States Patent [19]

Berry et al.

[11] Patent Number: 5,548,703

[45] Date of Patent: Aug. 20, 1996

[54] NAVIGATION WITHIN A COMPOUND GRAPHICAL OBJECT IN A GRAPHICAL USER INTERFACE

[75] Inventors: Richard E. Berry, Georgetown, Tex.; Susan F. Henshaw, Cary, N.C.; David J. Roberts, Stockton, Calif.

[73] Assignee: International Business Machines Corporation, Armonk, N.Y.

[21] Appl. No.: 159,873

[22] Filed: Nov. 30, 1993

[51] Int. Cl.$^6$ .................................................. G06F 15/00
[52] U.S. Cl. .......................................... 395/160; 395/155
[58] Field of Search .................................. 395/155, 161, 395/600, 650

[56] References Cited

U.S. PATENT DOCUMENTS

| | | | |
|---|---|---|---|
| 4,731,606 | 3/1988 | Bantz et al. | 345/118 |
| 4,821,211 | 4/1989 | Torres | 395/156 |
| 4,989,610 | 2/1991 | Patton et al. | 364/413.06 |
| 5,036,315 | 7/1991 | Gurley | 345/119 |
| 5,086,513 | 2/1992 | Lawrence et al. | 455/186.1 |
| 5,175,848 | 12/1992 | Dysart et al. | 395/600 |
| 5,198,802 | 3/1993 | Bertram et al. | 345/146 |
| 5,274,803 | 12/1993 | Dabin et al. | 395/600 |
| 5,319,777 | 6/1994 | Perez | 395/600 |
| 5,335,346 | 8/1994 | Fabbio | 395/600 |
| 5,394,521 | 2/1995 | Henderson, Jr. | 395/158 |
| 5,463,724 | 10/1995 | Anderson | 395/148 |

*Primary Examiner*—Mark R. Powell
*Assistant Examiner*—U. Chauhan
*Attorney, Agent, or Firm*—Jeffrey S. LaBaw

[57] ABSTRACT

A method, system and program for navigating within any compound graphical object in a graphical user interface presented on a display. The compound graphical object has an arbitrary number of hierarchically ranked levels. First, the system determines whether a command to move within the compound object was issued from a pointing device or from a keyboard device. If issued from a pointing device, a lowest level object in the compound object is found which encompasses a hot spot of a pointer icon controlled by the pointing device. The level to which the lowest level object belongs is made active. If the selection command was issued from a keyboard device, a next object in the compound object is selected, the next object being established by the keyboard user command and other information such as the relative hierarchical and spatial positions of the current and next objects.

25 Claims, 14 Drawing Sheets

| Year | Low | High |
|---|---|---|
| 1993 | 1017 | 1180 |
| 1992 | 950 | 1012 |
| 1991 | 813 | 940 |
| 1990 | 726 | 850 |
| 1989 | 650 | 780 |

| Year | Low | High |
|---|---|---|
| 1993 | 1017 | 1180 |
| 1992 | 950 | 1012 |
| 1991 | 813 | 940 |
| 1990 | 726 | 850 |
| 1989 | 650 | 780 |

| Year | Low | High |
|---|---|---|
| 1993 | 1017 | 1180 |
| 1992 | 950 | 1012 |
| 1991 | 813 | 940 |
| 1990 | 726 | 850 |
| 1989 | 650 | 780 |

NAVIGATION WITHIN A COMPOUND GRAPHICAL OBJECT IN A GRAPHICAL USER INTERFACE

BACKGROUND OF THE INVENTION

This invention relates generally to a graphical user interface to control a computer system. More particularly, it relates to manipulating compound objects within a graphical user interface.

It is well known to provide a graphical user interface (GUI) to allow a user to control a computer system and to present the results of user actions on the system display. In a graphical user interface, objects, e.g., applications and data files, are generally presented as windows or icons. Each object typically has a number of subobjects, generally presented as yet more windows or icons, which are associated with the object and are presented in the display space allocated to the window. The object and each of its subobjects are generally related and stored in memory in a data structure. The subobjects of the main window object may be called child objects of the main window object. As the main window object is composed of other objects, it is called a compound object.

In current graphical user interfaces, the display of cursorable and selectable objects is "flat". There is usually one plane of objects, such as icons representing documents, folders, printers, and so forth on a background sometimes referred to as a desktop. Generally, the GUIs in which these icons exist are homogeneous with respect to types of objects accommodated, or object-specific techniques are used for cursoring and selecting each object type.

Object-oriented graphical user interfaces will need to support compound objects. Compound objects are characterized by heterogeneous hierarchies of objects, nested one inside another, often many levels in depth. The objects involved are typically of widely varying types. For example, a compound text document might also contain a graph and a table. One cell of the table might contain image data, another cell might contain text data, and a third cell a graphical drawing. Each object in each cell might be further composed of yet other objects, and so forth.

Current techniques for selecting and cursoring are generally oriented to flat presentations of objects of the same type, such as icons on a desktop, cells in a spreadsheet, or graphical drawing objects in a graphics application. Techniques are usually provided for both pointing devices, such as a mouse, and keyboards. Keyboard techniques typically involve the use of a cursor, while mouse techniques use the mouse pointer. These existing techniques tend to be specialized to each different application type and do not address the problem of compound objects and hierarchical structures. As the techniques vary for different compound objects and different applications, a user does not know quite what to expect when manipulating a new composite object or application. It can be quite annoying to switch between objects or applications which exhibit different selection or cursoring behaviors. The actions taken as a result of a mouse input or a keyboard input can vary widely between compound objects. For some compound objects, the number of keystrokes may be quite large to navigate between levels.

In a single application, such as a document processing application, the application developers have the ability to maintain consistent behavior when the user interacts with diverse compound objects in the graphical user interface. However, in the object oriented programming of the future, where a multitude of objects written by different programmers operate in the same GUI, a single standard is not easy to maintain. The potential exists that at least some of the objects created in the future may have fundamentally different purposes than those presently existing. Rigorous adherence to a single standard could result in long and confusing sequences of keystrokes to navigate between subobjects in a compound object.

The Applicants believe that users need a common and consistent set of techniques for selecting and cursoring within composite objects which has not been provided by the prior art. This invention proposes a model for dealing with hierarchies of objects and techniques for selecting and cursoring across and within levels of hierarchies containing different types of objects.

SUMMARY OF THE INVENTION

Therefore, it is an object of the invention to navigate between levels of a composite object in a predictably graphical user interface in both a pointing device and keyboard mode.

It is another object of the invention to provide short sequences for common navigation paths between levels of a composite object.

These objects and others are accomplished by a method, system and program for navigating a selection within any compound graphical object in a graphical user interface presented on a display. The compound graphical object has an arbitrary number of hierarchically ranked levels at which several subobjects may reside. Further, the compound object can originate from any or several of a plurality of application programs running concurrently on a computer system. Each object must be written to follow a particular protocol for determining whether it handles an input event, or if not, to which object to pass the event. First, the object determines whether a selection command to move the cursor within the compound object was issued from a pointing device or from a keyboard device. If issued from a pointing device, the objects pass the event to a lower level object until a lowest level object in the compound object which encompasses a hot spot of a pointer icon is found. The lowest level object is made active and selections and cursors are presented within the objects's level.

If the command was issued from a keyboard device, the object finds a next object in the compound object, the next object being established by the type of keyboard command and other information such as the relative hierarchical and spatial positions of the current and next objects. For keyboard input, the level to which the next object belongs is made active and the selection is presented within the object in the active level in the graphical user interface.

BRIEF DESCRIPTION OF THE DRAWINGS

These objects, features and advantages will be more clearly understood with reference to the attached drawings and following description.

FIGS. 6A–6C depict navigation through a table object using a pointing device.

FIGS. 6D–6F depict navigation through a table object during swipe selection.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although, the specific choice of computer is limited only by disk and disk storage requirements, computers in the IBM PS/2 (TM) series of computers could be used in the present invention. For additional information on IBM's PS/2 series of computers, the reader is referred to *Technical Reference Manual* Personal Systems/2 Model 50, 60 Systems IBM Corporation, Part No. 68X2224 Order Number S68X-2224 and *Technical Reference Manual* Personal Systems/2 (Model 80) IBM Corporation Part No. 68X 2256 Order Number S68X-2254. One operating system which an IBM PS/2 personal computer may run is IBM's OS/2 2.0 (TM) for more information on the IBM OS/2 2.0 Operating System the reader is referred to OS/2 2.0 *Technical Library, Programming Guide* Vol. 1, 2, 3 *Version* 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
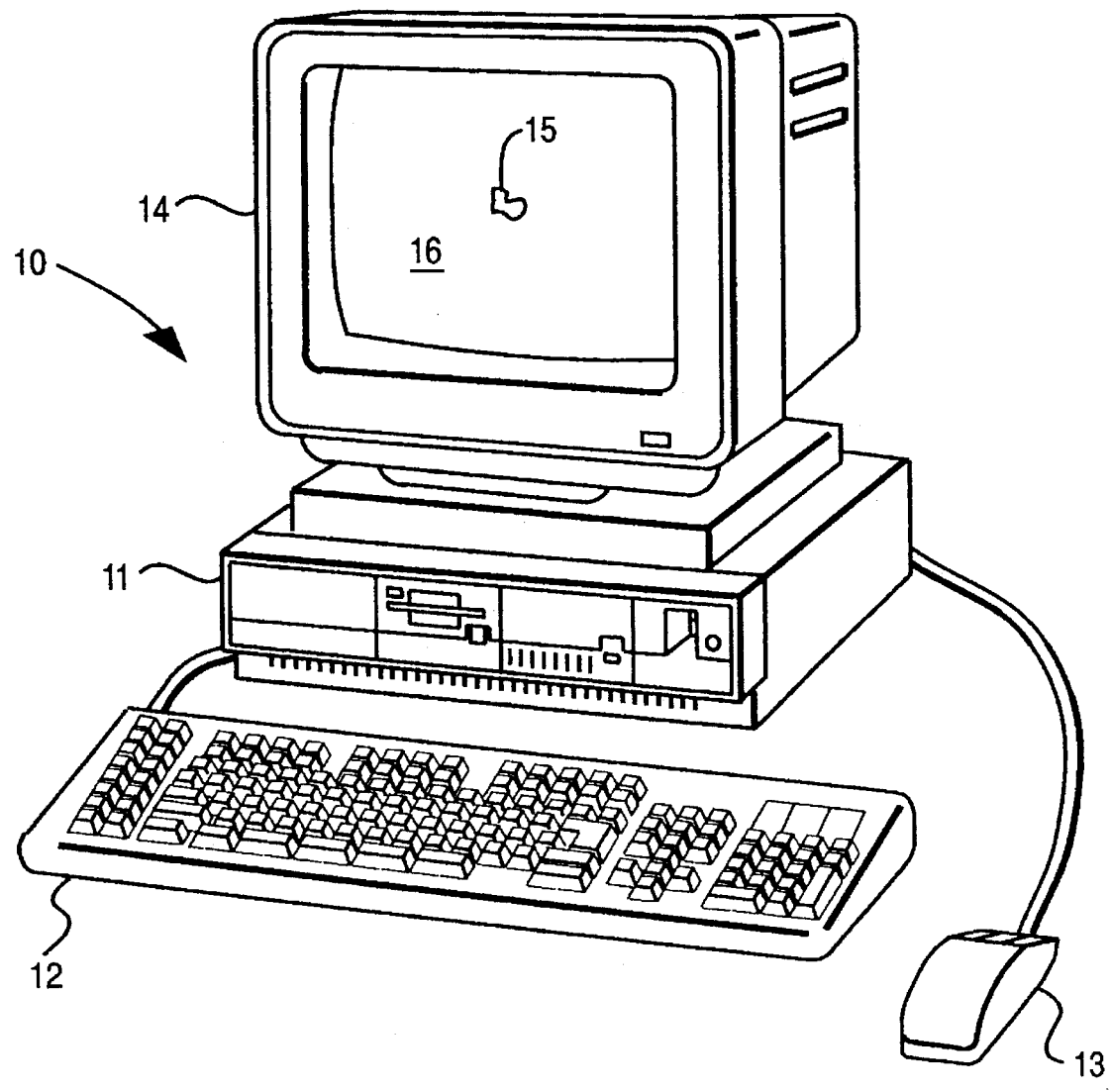
FIG. 1 shows a computer comprising system unit, keyboard, mouse and display.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user command or selection.

Figure 2:
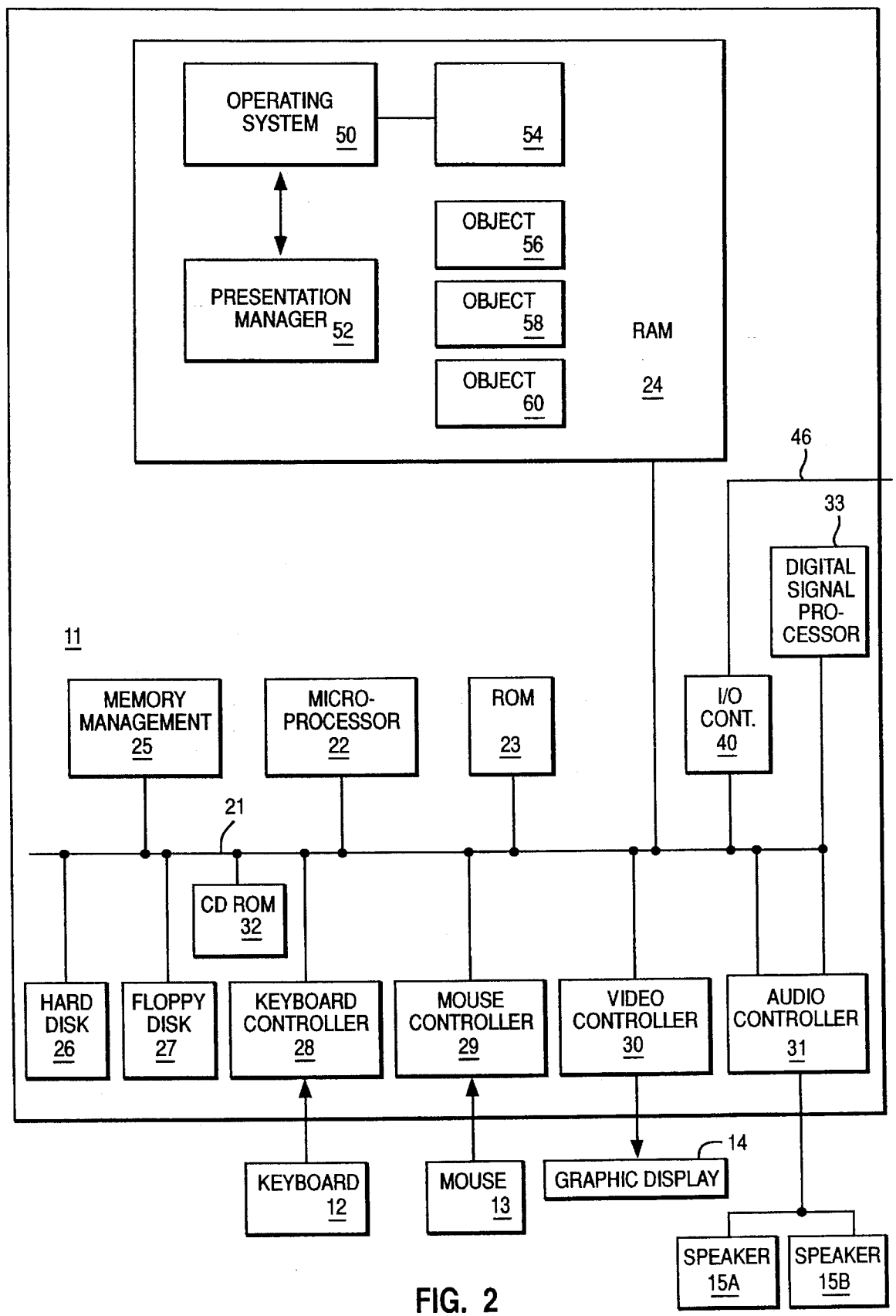
FIG. 2 is a block diagram of the components of the computer shown in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other codes, the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to the system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the audio controller 31 is the hardware interface for the speakers 15a and 15b. Also coupled to the system bus 21 is digital signal processor 33, which corrects the sound produced by the speaker system and is preferably incorporated into the audio controller 31. The speakers 15a and 15b may be used to present audio objects to the user. An I/O controller 40, such as a Token Ring Adapter, enables communication over a network 46 to other similarly configured data processing systems.

One of the preferred implementations of the present invention is as a set of instructions in a code module resident in the random access memory. Until required by the computer system, the set of instructions may be stored in another computer memory, for example, the hard disk in hard disk drive 26, or a removable memory such as an optical disk for the CD ROM 32 or a floppy disk for the floppy disk drive 27. As shown in the figure, the operating system 50 and presentation manager 52 are resident in RAM 24. In this example, the invention is embodied in a code module 54 which is an adjunct onto the operating system or presentation manager. The code module 54 contains template tools which can be used by application developers to create graphical objects. When an application developer uses these tools, the graphical objects created will exhibit the behaviors described below. For new objects, which do not have a corresponding template tool in code module 54, the application developer will have to provide the same type of behaviors by coding from ground up. It is important that each of the objects understand whether it is to handle a given input event, and if not, to which object within the compound object to pass the input event. Data structures 56, 58 and 60, also resident in RAM 24, embody three composite objects which have been created with the tools in code module 54.

Likewise, the data structures 56, 58 and 60 may be stored in another computer memory until required.

A composite object is treated as a hierarchy of structures. According to the invention, only one level of the structure is "active" at a time. The active level according to the invention is the only level in which typing cursor, the selection cursor, and currently selected items are shown in the compound object or a subobject thereof. The reader can visualize navigation within the composite object as occurring in three dimensions, by first navigating to a particular level (z-axis) then navigating within the level (x-axis and y-axis). Navigation and selection and techniques are defined for both mouse and keyboard devices. It should be understood that the mouse techniques are generally applicable to any pointing device, including trackball, stylus, and touch devices.

Figure 3:
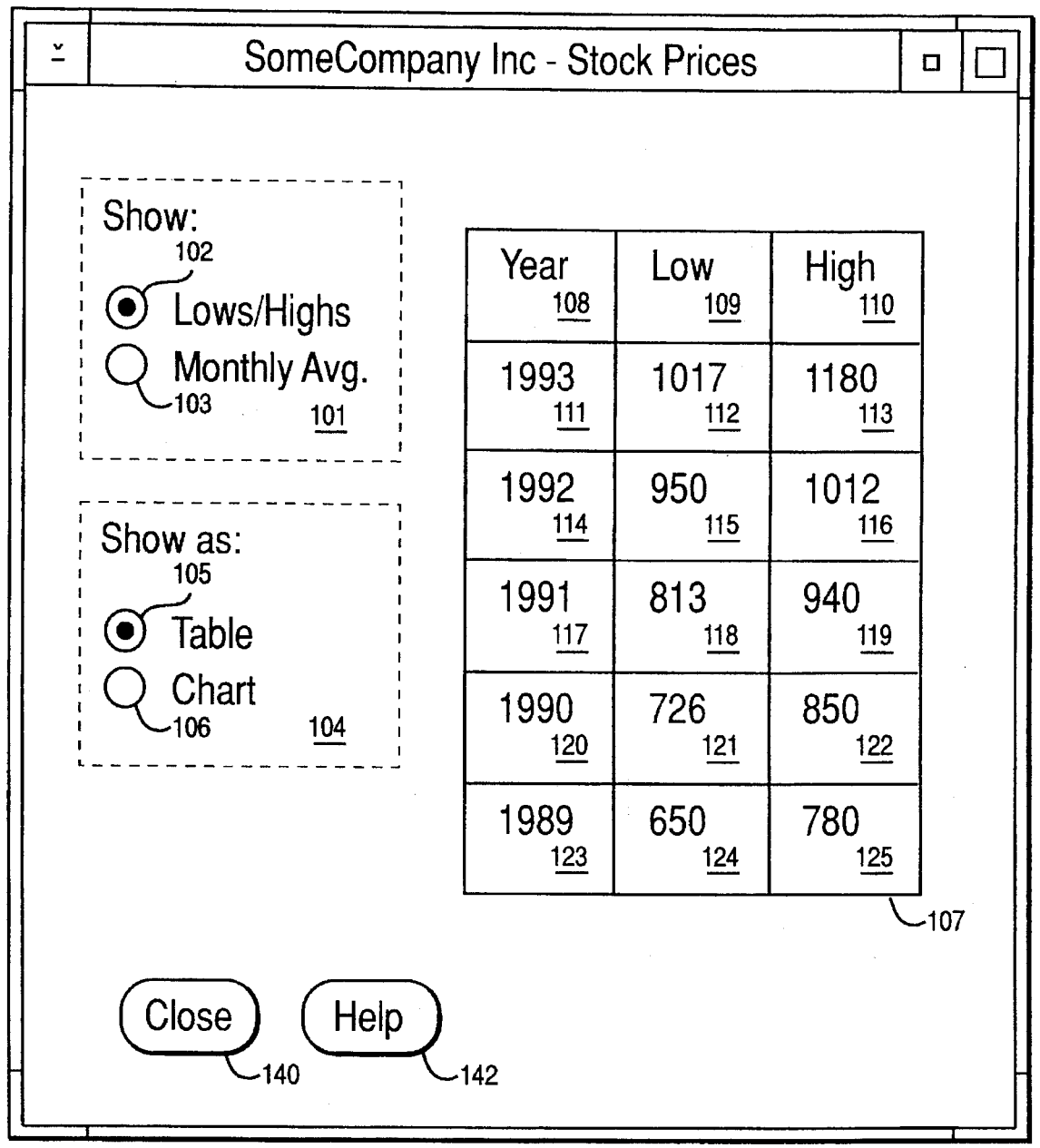
FIG. 3 depicts a compound object as would be displayed on the system display comprising a window or root object, two radio button fields, two push buttons and a table.

Referring to FIG. 3, the window 100 titled "SomeCompanyInc-Stock Prices" displays a hierarchically organized composite object containing five main visual objects, which are subobjects or child objects of the window. The subobjects may have further subobjects or child objects. For example, ShowField, a radio button field 101 contains two choices, "Lows/Highs" 102 and "Monthly Ave" 103, subobjects to the radio button field 101. ShowAsField, is a radio button field 104 containing two subobject choices: "Table" 105 and "Chart" 106. Table1, is a table 107 containing 18 cells 108–125 all of which are subelement of the table object 107 arranged as three columns and six rows. CloseButton, is a push button 140 which closes the window 100, it has no subobjects. HelpButton, a push button 142 which provides Help text on how to use the window 100, also has no subobjects.

Figure 4:
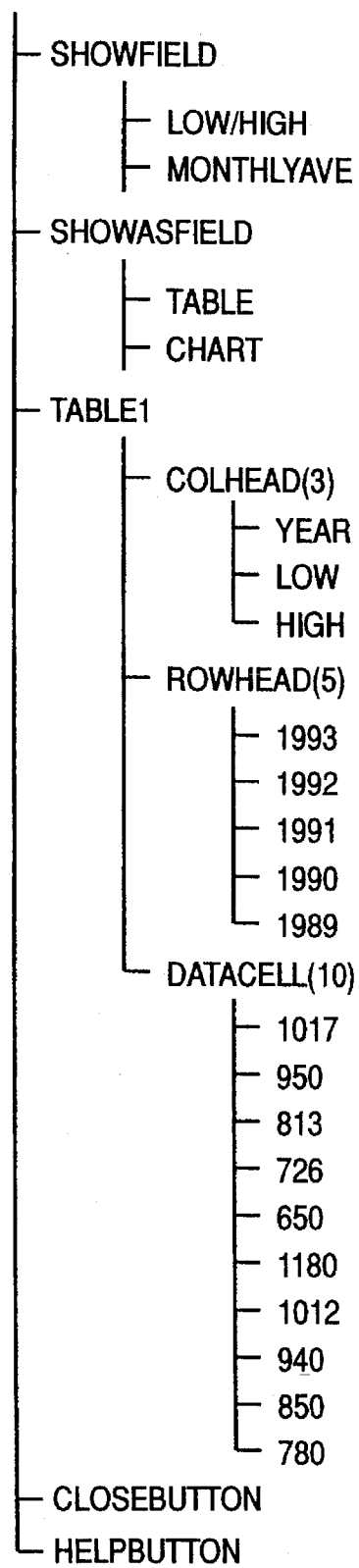
FIG. 4 depicts the compound object shown in FIG. 3 in tree form.

As they are composed of subobjects, the two radio button fields 101, 104 and the table 107 are also composite objects. The radio button fields 101, 104 contain choices 102, 103, 105, 106 and the table contains cells 108–123. The composition of the window is shown in FIG. 4 as a tree diagram. The horizontal axis of the tree diagram represents the levels (z-axis) of objects within the GUI, as they have been defined by the application developer (s). As object oriented programming becomes more popular, some of the subobjects within the compound object will be written by other programmers, and will contain a hierarchy established by a different application than that displaying the overall compound object. Going down the vertical axis shows which objects are at the same level of the containment hierarchy.

These levels are useful in the operation of the interface, specifically with respect to cursoring between and selection of objects by a user. These levels are called out in the figure. Associated with each level are: the objects contained in the level, the object on which the cursor is positioned, and the objects which are currently selected. As some of the objects at these levels may not be suitable for input from the keyboard, navigation within a level or between levels may cause the system to automatically navigate down a level to a more suitable object. For example, if navigation by keyboard would normally take the user to the cell level of the table, the system may automatically navigate to the text level below the cell level for alphanumeric entry.

According to the present invention, only one level of a compound object is active at a time. The cursor and selection highlighting are shown only in the active level. However, as mentioned previously, the application developer may decide at which level within the compound object objects may maintain separate "active" levels. For example, the five main subobjects 101, 104, 107, 140 and 142 may each display selected objects therein, however, each may only do so at a single active level. Navigation occurs in three dimensions by first navigating to a particular level (z-axis), then navigating within that level (x-axis and y-axis). The user controls navigation between levels using mouse and/or keyboard techniques that are the subject of this invention. Navigation between and selection of objects within a level follows the techniques currently understood within the field, such as those prescribed by IBM's Common User Access (CUA) guidelines. However, one skilled in the art would understand that other techniques for navigation within the level could be used. The reader is referred to *System Application Architecture Common User Access Guide to User Interface Design* SC34-4289 (Oct. 1991) and *Systems Application Architecture Common User Access Advanced Interface Design Reference* SC34-4290 (Oct. 1991) both publications of and available from the IBM Corporation.

For example, in the GUI in FIG. 3, the topmost level is the window. From FIG. 4, it may be seen that the window 100, at its second level, consists of two radio button fields, a table, and two push buttons. Navigation at this second level using the keyboard would typically be done by using the Tab key to move a cursor between these five objects. Since the two radio button fields and the table are themselves composite objects, navigation to one of these objects will result in the option for continued navigation to a lower level selection. In the table, the cursor can be placed on one of the cells or to the text in a yet lower level within the table, the user can meaningfully navigate at both the cell level and within the contents of a cell. When the cell contents are text, for example, the user can navigate to a desired cell and then navigate to a desired character position within the cell. The table therefore exhibits three levels of navigation scope. From the radio button fields, navigation can take one of two forms. The fields themselves are in the navigation scope of the window so that a user can tab across to another object at the window level. Further, as each radio button field is composed of choices which are subobjects, a user may elect to navigate to a lower level to one of the choices. In the push buttons, the cursor is simply placed on the button itself.

Similarly, selection potential may exist at each of the levels in this example. The user may select a choice within each of the radio button fields, a cell or range of cells within the table, or a text position or range of text characters within a cell.

Figure 5:
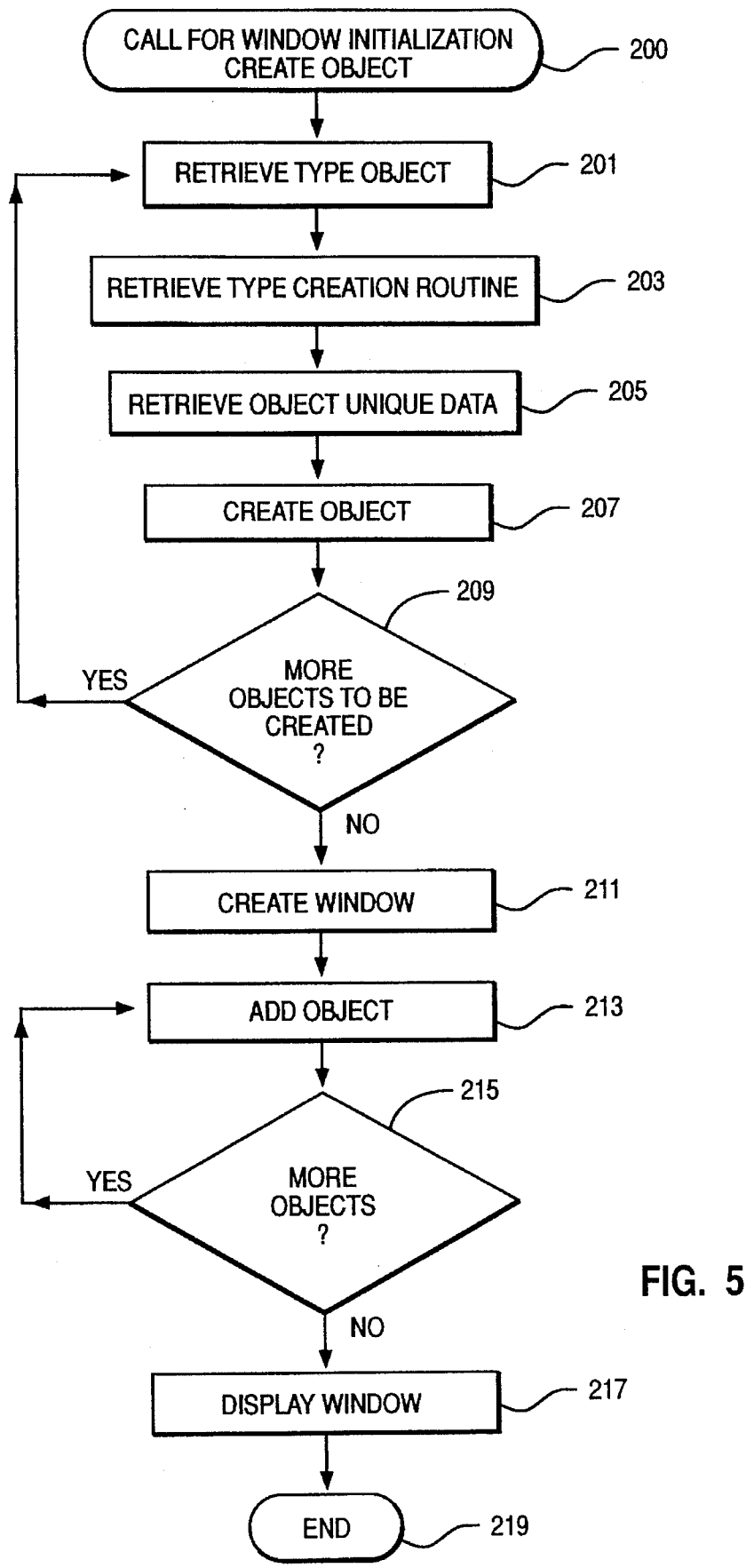
FIG. 5 is a flow diagram for displaying the object on the system display.

The process for displaying a compound object as shown in FIGS. 3 and 4 is described in connection with the flow diagram in FIG. 5. This process is well known to the art and occurs in operating systems such as IBM's OS/2. After a cell for window initialization, step 200, due to the user selection of an application program or function therein, a data structure is retrieved which contains the information necessary for display of the compound object. Some skilled in the art make a distinction between the objects as they are stored in memory and the graphical objects as they are displayed. In the flow diagram, where the creation of an object is indicated, it is referring to the creation of a graphical object. The process begins by retrieving information object-by-object within the composite object. In this flow diagram, the process retrieves main objects at the window level, that is the radio field buttons, the push buttons and the table in FIG. 3. Other processes might conceivably start at lower levels within a compound object.

In step 201, the type of object is retrieved from the data structure for the first object, e.g., radio button field. Next, in step 203, the creation routine for that type of object is retrieved. In step 205, the unique data associated with this particular radio button field, for example, "Lows/Highs", "Monthly Data", etc., is retrieved to add the child objects. The process uses the creation routine and the object unique data to create the object in step 207. A test is performed in step 209 to determine whether there are more graphical objects to be created. If so, the process loops until all the graphical objects in the window have been created. Once all the graphical objects are created in step 211, the window is created and each of the objects is added to the window object in steps 213 and 215. Once all the subobjects have been added to the window object in step 217, the window is displayed and the process ends, step 219.

Pseudo code main for window object initialization follows:

---

...
showField=RadioField new
show Field addDefault Choice: "Lows/Highs"
showField addChoice: "Monthly Ave".

...
closeButton=PushButton new
closeButton setLabel: "Close"

...
table1=Table new; rows: 6,cols:3
table1 setColHeads: "Year", "Low", "High"

...
fieldArray=ArrayOfFields new; rows:5,cols:3
table1 associate: fieldArray at: 2,1

...
window=Window new
window title: "SomeCompanyInc - Stock Prices"
window addObject: showField ...
window addObject: closeButton ...
window addObject table1

---

Mouse Technique

It should be understood that mouse technique are generally applicable to any pointing device, including trackball, stylus, and touch screens.

A mouse or other pointing device controls the selection of items in the graphical user interface by means of a pointer icon. The pointer icon has a particular point called the "hot spot" which is used to determine the precise location attributable to the pointer icon. Selection, therefore, in a pointing device paradigm is primarily dependent upon the location of the "hot spot".

An unaugmented click of the Select button, conventionally the left button of the mouse, causes navigation between levels of the compound object and simultaneous selection in the resulting active level. The lowest object level that can be unambiguously identified as encompassing the hot spot on the mouse pointer becomes selected and its level becomes the active level. The normal selection paradigm applies within the level once it becomes active. For example, following CUA, if the level contains a single-choice selection field which is a menu containing a plurality of choices only one of which can be selected, any previously selected choice becomes deselected and the choice under the pointer's hot spot becomes selected. Or, if the level contains a text entry field, any previous typing cursor position is ignored and the typing cursor is repositioned to the location of the mouse pointer's hot spot. Any typing cursor and selections in the last level in which the pointer was located are made not-visible.

FIGS. 6A and 6B show the navigation of the mouse pointer to a new position within a table object, the table object 107 from FIG. 3. In FIG. 6A, the cell 112 containing the text "1017" is currently selected and the selection cursor 220 displayed therein in reverse video. As shown in FIG. 6B, the user has moved the mouse pointer to a new cell 116 and clicked at a position midway between the text "1012". The typing cursor 221, indicating selection, is then shown in this text field within the cell. Notice that the text is the lowest level object in which the mouse pointer position can be determined and also that the previous selection, the highlighted cell 112, has been made not-visible.

An augmented click of the Select button also causes navigation between levels. However, unlike the unaugmented click, it does not result in simultaneous selection in the resulting active level. An augmented click of the select button is accomplished when another mouse or keyboard key is depressed. The lowest level that can be unambiguously identified by the hot spot on the mouse pointer becomes the active level. Selection emphasis is made visible for any choices previously selected in the level. Similarly, any previously positioned typing cursor is made visible. Any typing cursor and selections in the level from which the pointer originated are made not-visible.

FIGS. 6A and 6C depict changes to the table 107 after an augmented selection by the mouse. From the selected cell 112 in FIG. 6A, the user has moved the mouse pointer to a position 222 in cell 121. After performing an augmented click of the select button, the result is shown in FIG. 6C. In this case, the augmented click causes the previously selected "65" to be highlighted with the selection emphasis 223 and the typing cursor 221 to be positioned where it was last positioned in the text.

The invention also includes selection actions that begin in one level and transition across a level boundary to cause a level switch to the next higher level. Selection then continues in the higher level. For example, given a table of cells where each cell contains some text, the mouse can be used for swipe selecting within the text level of a cell, selecting only the text characters within that cell and no level switch occurs. On the other hand, during the swipe selection technique, the hot spot on the mouse pointer may cross the boundary between the space reserved for the text and the border of the cell containing the text. If this happens, a level switch occurs and the cell level of the table becomes the active level. The entire cell then becomes selected. As swiping continues into the adjacent cell, it also becomes completely selected. For a mouse, swipe selecting can be accomplished by holding the select button and moving the mouse pointer to highlight more text. Other pointing devices would have similar types of user actions.

Figures 6D, 6E, 6F:
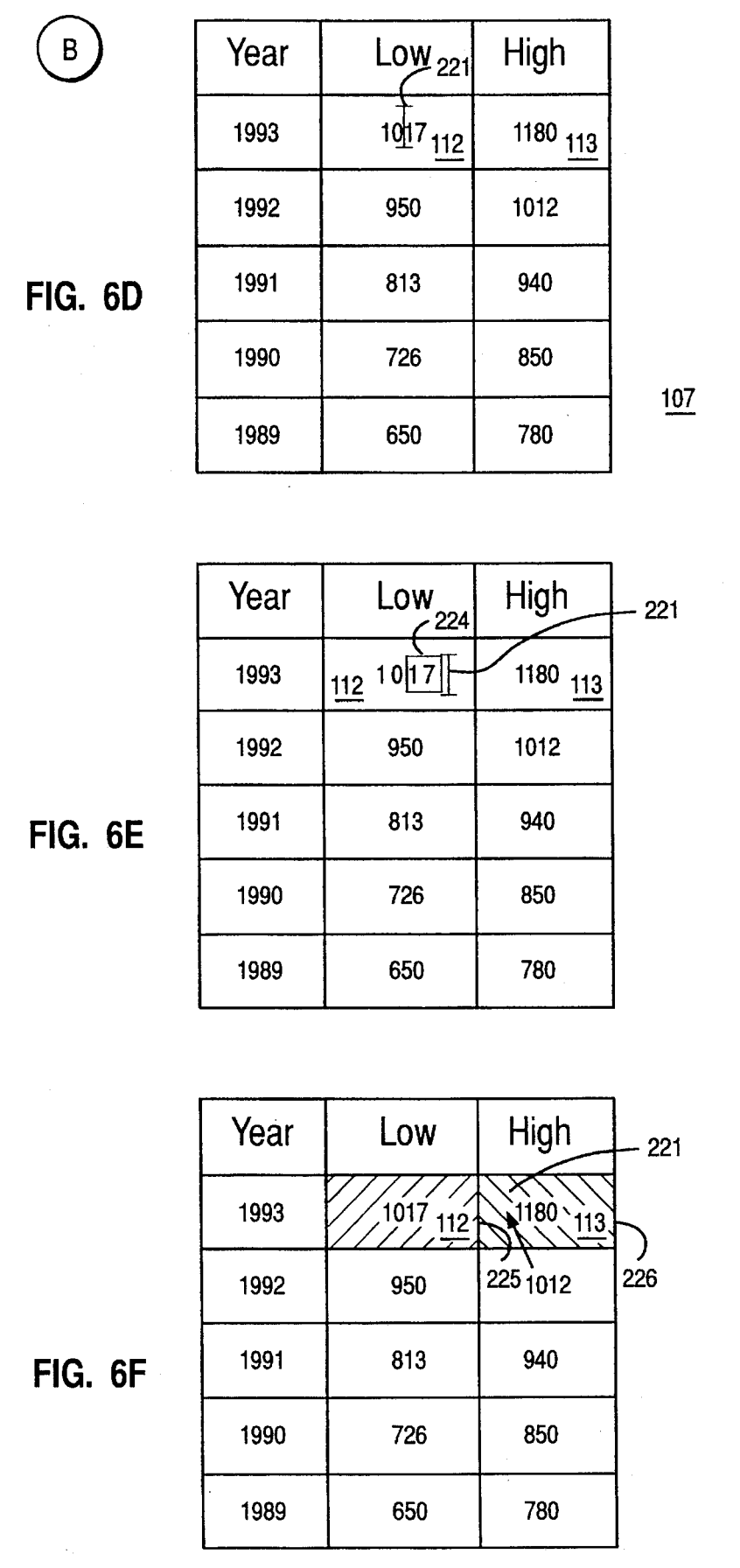

Swipe selection is depicted in FIGS. 6D, 6E and 6F. In FIG. 6D, the mouse pointer 221 is displayed in the middle of the text "1017" of cell 112. Presuming that the user holds the Select button and moves the mouse pointer to the right, as shown in FIG. 6E, the mouse pointer 221 would move to the end of the text causing text "17" to be selected and highlighted by reverse video 224. If the user continues to move the mouse pointer, he will cross the cell boundary 225 between cells 112 and 113 forcing the level switch to the next higher level, the cell level. The mouse pointer 221 will change back to the cell level pointer icon, an "arrow" icon, and both cells will be selected as shown by reverse video 226. The process continues as long as swipe selection continues.

Keyboard Technique

The paradigm for keyboard input differs from that of a pointing device. While arrow keys exist on a keyboard, it is very awkward to use them to position a pointer icon. Therefore, the present invention does not use them for that purpose. Primarily, the arrow keys or a tab key are utilized to navigate from object to object. Thus, the keyboard paradigm is not concerned with a hot spot of a pointer icon, but the object at which the keyboard cursor is located and that object's level within and interrelationship to other objects in the compound object's hierarchy. Further, as a keyboard is primarily used for alphanumeric input, navigation to a field in which such input can be accomplished is desirable.

Navigation between levels using the keyboard is accomplished implicitly, i.e. while cursoring between items within a particular level. Also, the invention includes explicit navigation between levels by using augmentation keys while cursoring. As an example of the first type of interlevel travel, according to the invention, when navigation to a radio button field occurs from a previous object at the same level, the radio button field passes the keyboard event further to one of the choices within the field, because there is no meaningful action the user can take on the field as a whole. Thus, each object may contain a default behavior that indicates it is not the appropriate recipient of keyboard input. In the preferred embodiment, navigation to the table itself may automatically cause navigation to a particular cell, or to the text within that cell, if there are no meaningful actions the user can take on the table as a whole.

Navigation within a level occurs, when a first set of keys is depressed, e.g., when an arrow key or the tab key is depressed, indicating navigation to "the next" object within the graphical object at that level. The next object must be determined with reference to the active level, the compound object hierarchy and possibly the display location of the objects within the hierarchy. For example, if the current selected object was the Low/High choice 102, a tab or a down arrow key would result in selection of the "Monthly Average", choice 103. If a right arrow key were depressed, since an arrow key implies direction to the system, the system would know to refer to location data as well and the table would be selected. Once the next object within the active level is found, an implicit level switch to a lower level object within the next object may occur as described above.

Explicit techniques of switching levels are also provided by using a second set of keys, for example, by using augmentation keys while navigating by the tab and arrow keys. For example, the Alt+UpArrow and Alt+DownArrow keys can be defined to navigate between levels of the hierarchy. Thus, a user operating at the text level within a cell of a table could navigate to the cell level by depressing the Alt+UpArrow key combination. At the cell level, the user can continue to select several adjacent cells, for manipulation. Navigation between levels using the keyboard always occurs without a new simultaneous selection in the resulting active level. When a level switch occurs, selection emphasis is made visible for any choices previously selected in the level. Similarly, any previously positioned typing cursor is made visible. Any typing cursor and selections in the level from which the user focus originated are made not-visible.

The method for keyboard navigation through a compound object includes yet another explicit augmentation technique by using a third set of keys which allows users to traverse several levels up the hierarchy and to an adjacent item with one keystroke combination. For example, the Ctrl+Tab key combination can be defined so that a user operating at the text level within a cell of a table can immediately exit the table and navigate to the next user interface control at the same level as the table. For example, this explicit technique would be used to navigate from the text level of a cell to one of the radio buttons or push buttons, in the GUI in FIG. 3. To be most useful, the level to which this technique transitions must be defined by the application developer who understands the user's task and knows which level the user will most likely desire.

There is also a swipe selection using the keyboard which consists of holding an augmentation key, such as Shift, while cursoring. Crossing a level boundary causes a level shift as described above for the mouse technique with similar effect. Those skilled in the art would recognize that other combinations of keys could be used to perform the navigation and explicit augmentation techniques.

Figure 7A:
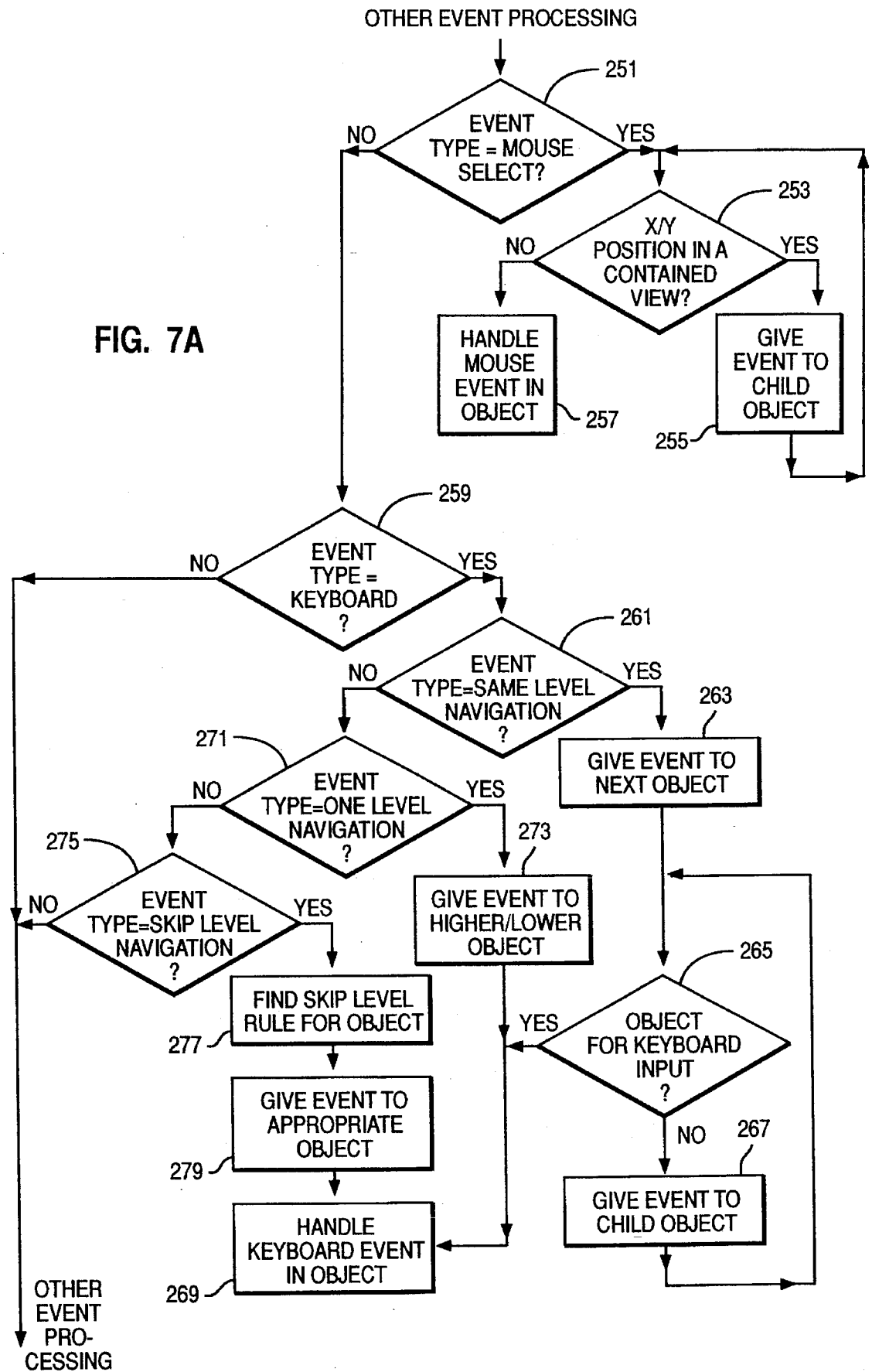
FIGS. 7A–7C are flow diagrams of event handling for as the user manipulates the mouse pointer and keyboard cursor within the compound document.
Figure 7B:
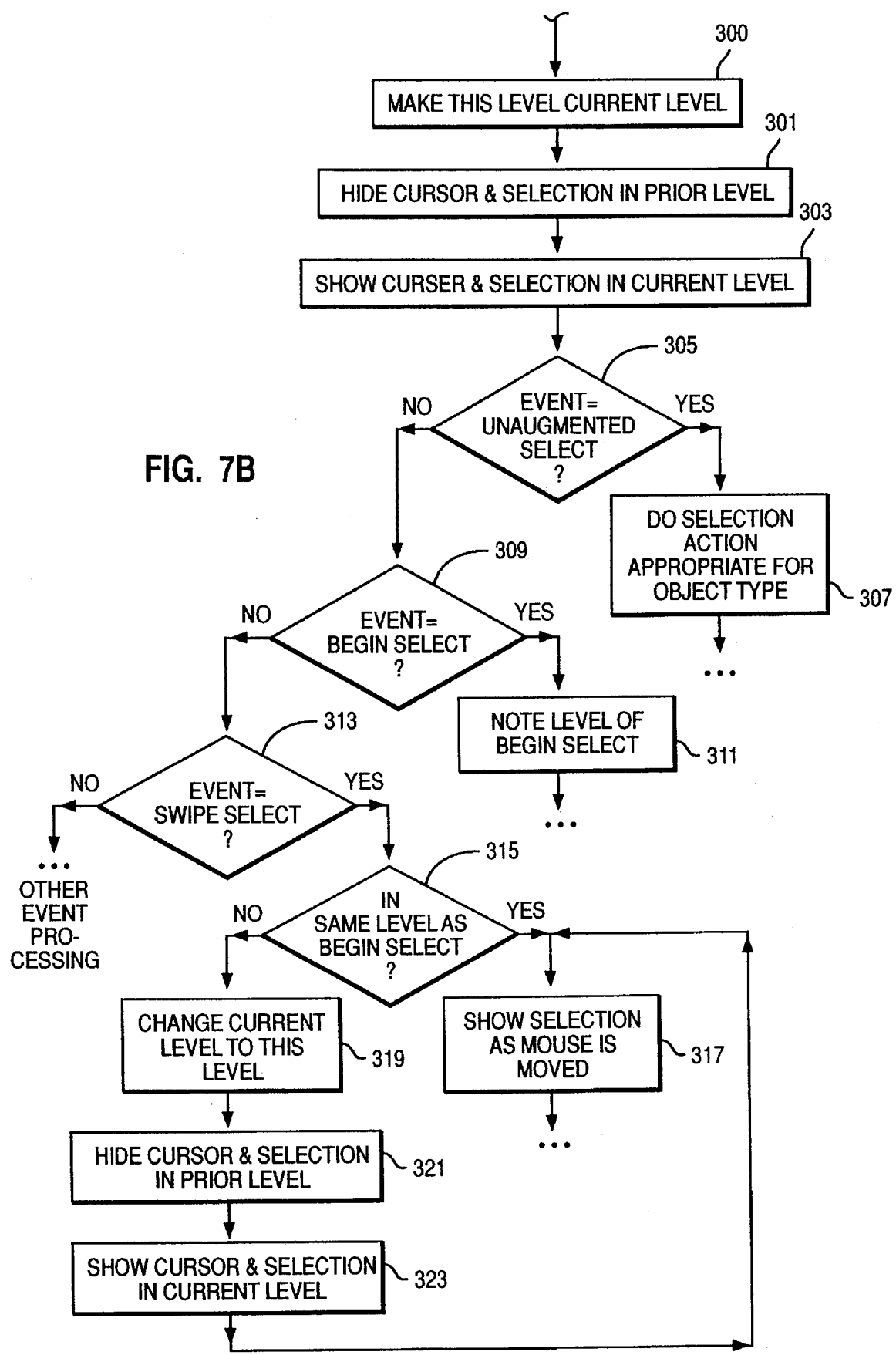
Figure 7C:
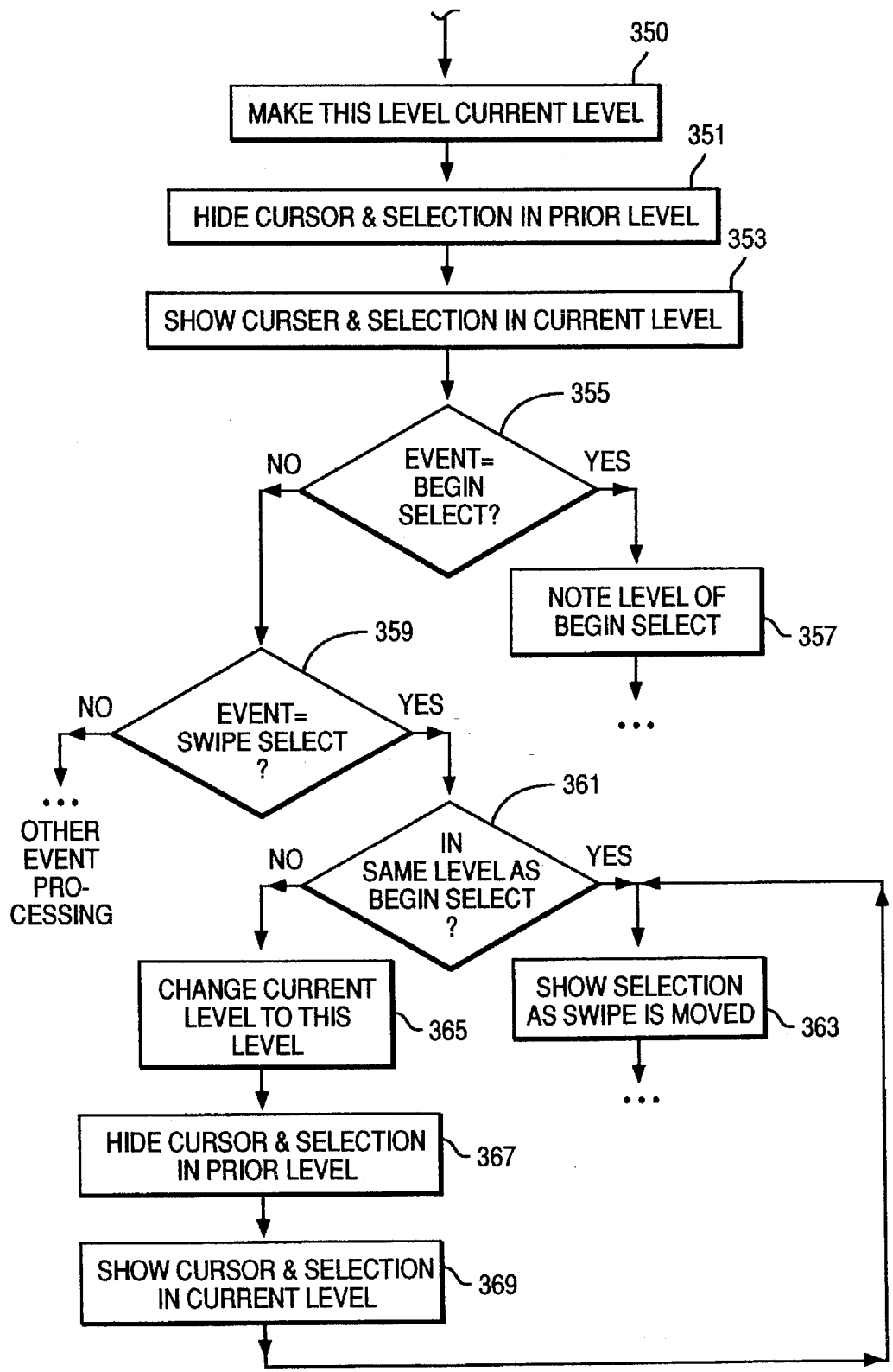

FIGS. 7A through 7C are flow diagrams depicting the event handling for mouse and keyboard input as described above in accordance with the present invention. FIG. 7A depicts the process by which a system determines the event type, e.g., mouse or keyboard, and the level within the compound object at which the event will be handled.

Beginning at the top of the object hierarchy in step 251, the window's event handling process tests whether the type of event is a mouse event. If the event is a mouse select, a test is performed in step 253 to determine whether the x/y position of the selection, the hot spot of the pointer icon, is in an area of the window which is assigned to a child object. If the selection is within one of the fields within the window assigned to a child object, the event is given to the event handling routine for the child object in step 255. The determination of an x/y position of the mouse pointer during selection and the x/y position of graphical object within a GUI is a well known function of operating systems and is outside the purview of this invention. The child object repeats this process to determine whether the x/y selection is in an area of assigned to one of its child objects. This recursion continues until the event has been passed to the bottom-most object in the hierarchy which encompasses the x/y position. This object must handle the event, step 257.

If the event is not a mouse event, in step 259, the window's event handling process tests whether the type of event is a keyboard event. If the event is not a keyboard event, the system goes on to other event processing. If it is a keyboard event, in step 261, the object in which the cursor is currently located determines whether the event type is a same level navigation command. In the examples above, a same level navigation command would be signified by a tab or arrow key depression. If so, in step 263, the event is given to the next object in the same level. The next object is determined according to the compound object's hierarchy, the current active level, and, in the case of arrow keys, location information kept about each subobject within the compound object. Once the next object is selected, in test 265, the next object determines whether it is appropriate for keyboard input. If it is not, the event is given to a child object within the next object in step 267 and that child object is tested in step 265 to determine whether it is suitable for a keyboard input. Once a child object is determined to be suitable for keyboard input, the keyboard event is handled within the object in step 269.

If the event type is not the same level navigation, in step 271, the object in which the cursor is currently located determines whether the event type is a one level navigation step, i.e. either up or down. For example, as described above, this could be accomplished by a Alt+UpArrow or Alt+DownArrow key combination respectively. If explicit one level navigation is requested by the user, in step 273, the event is given to the appropriate higher or lower level object. In step 269, the keyboard event is handled within this object. If the event type is neither same level nor one level navigation, in step 275, a test is performed to determine whether it is a skip level navigation. For example, as proposed above, the control + tab key combination can be so defined. In step 277, the skip level rule for this object is found. Once the skip level rule is determined for this particular compound object the event is given to the appropriate object according to this rule in step 279. Then, in step 269, the keyboard event is handled within this object.

Input event handling within the selected object is depicted in FIG. 7B for mouse event handling. The level of the object handling the event is made the current level in step 300. In step 301, the process hides the cursor and the selection highlighting from any prior level. In step 303, the process shows the cursor and selection highlighting, if any, in the current level.

A test is performed in step 305 to determine if the event is an unaugmented select action. In step 307, a selection action appropriate to the type of object being selected is performed. For example, if the object is a bar in a bar chart, selection handles would typically be displayed on the bar. The system returns to normal event handling until the next input event is detected within the compound object.

If the event is determined to be the beginning of a range selection in step 309, the current level is noted to determine if the range selection crosses a level boundary at some later time in step 311.

If in step 313, the object determines that the user is performing a range selection, by moving the mouse while holding the select button, in step 315, a test is made to determine if a level boundary has been crossed. For example, while selecting a string of characters in a table cell the mouse pointer might cross into the adjacent cell. If this occurs, the current level is changed in step 319 to the next higher level indicated by the boundary crossing. In step 321, the cursor and selection in the prior level are hidden. The cursor and selection in the new current level are shown in step 323. Finally, selection continues at the new level, step 317, (cell level in the example) as the mouse continues to be moved.

Once the next object is determined, the handling of keyboard events within the object parallel those for the mouse. They are detected in each object's event handling routine and are handled by routines similar to those of the mouse and are depicted in FIG. 7C. Steps 350 through 369 in the figure basically parallel those in FIG. 7B with the exception that there is no test to determine whether the event is an unaugmented selection.

Object event handling pseudo code for object event handling follows

```
...
case EventType of
    MouseSelect:
        forEachChild
            if containsPoint: XY do
                (handle event in child
                object)
                    sendmessage with:Event
            else
                (handle event in this
                object)
                    activeLevelObj hideCusor
                    activeLevel = currentLevel
                    activeLevelObj showCursor
                activeLevelObj showSelection
                case EvntSubType of
                    plainSelection:
                        (do normal select processing)
                    BeginSelect:
                        beginLevel = currentLevel
                    RangeSelect:
                        if currentLevel ne beginLevel
                            activeLevelObj hideCusor
                            activeLevelObj hideSelection
                            activeLevel = currentLevel
```

-continued

```
                            activeLevelObj showSelection
                            (normal range selection processing)
                            ...
                            ...
    KeyboardSelect:
        (processing similar to mouse selection)
    ... (processing of other events)
    KeyboardSelect:
        case EventSubType of
            plainSelection:
                (do normal select processing)
            BeginSelect:
                beginLevel = currentLevel
            RangeSelect:
                if currentLevel ne beginLevel
                    activeLevelObj hideCursor
                    activeLevelObj hideSelection
                    activeLevel = currentLevel
                    activeLevelObj showSelection
                    activeLevelObj showCursor
                (normal range selection processing)
    KeyboardUpLevel:        /*e.g., using Alt+Up Arrow Key*/
        if currentLevel notEqual rootLevel
            activeLevelObj hideCursor
            activeLevelObj hideSelection
            currentLevel = currentLevel - 1
            activeLevel = currentLevel
            activeLevelObj showSelection
            activeLevelObj showCursor
    KeyboardDownLevel:      /*e.g., using Alt+Down Arrow key*/
        if currentLevel notEqual bottomLevel
            activeLevelObj hideCurosr
            activeLevelObj hideSelection
            currentLevel = currentLevel + 1
            activeLevel = currentLevel
            activeLevelObj showSelection
            activeLevelObj showCursor
... (processing of other events)
```

Figure 8A:
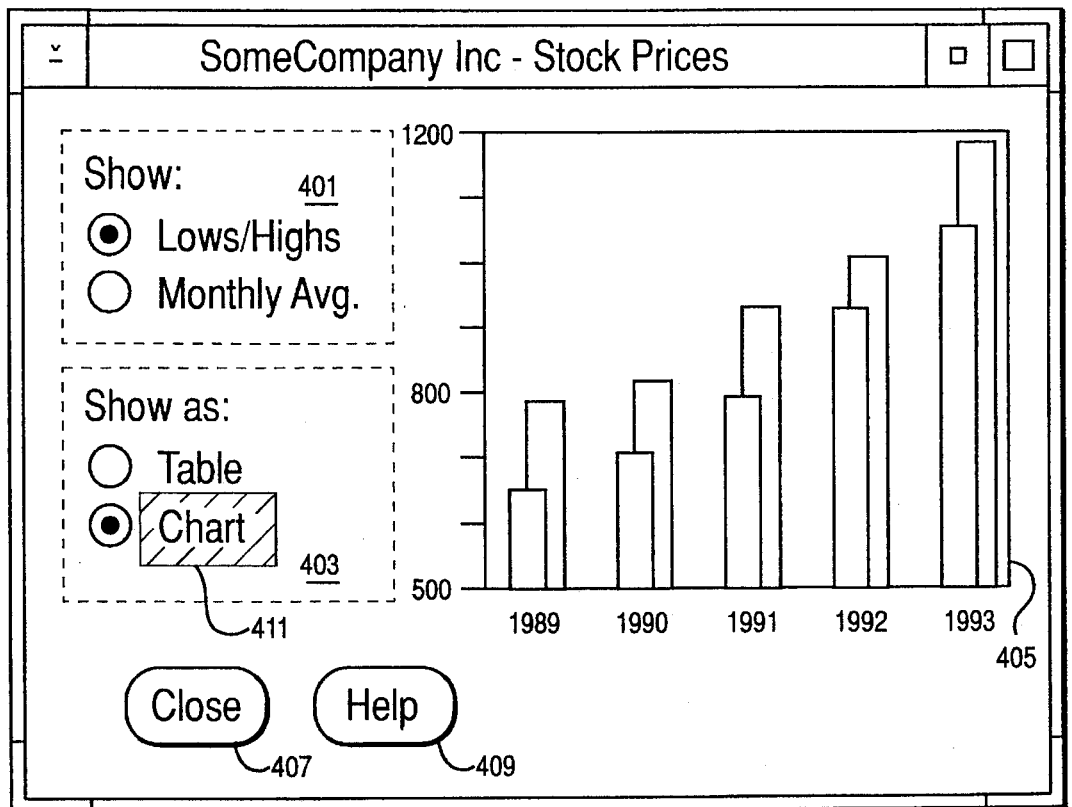
FIGS. 8A and 8B depict a compound document as displayed on the system display comprising a window having two radio button fields, two push buttons and a bar chart object.
Figure 8B:
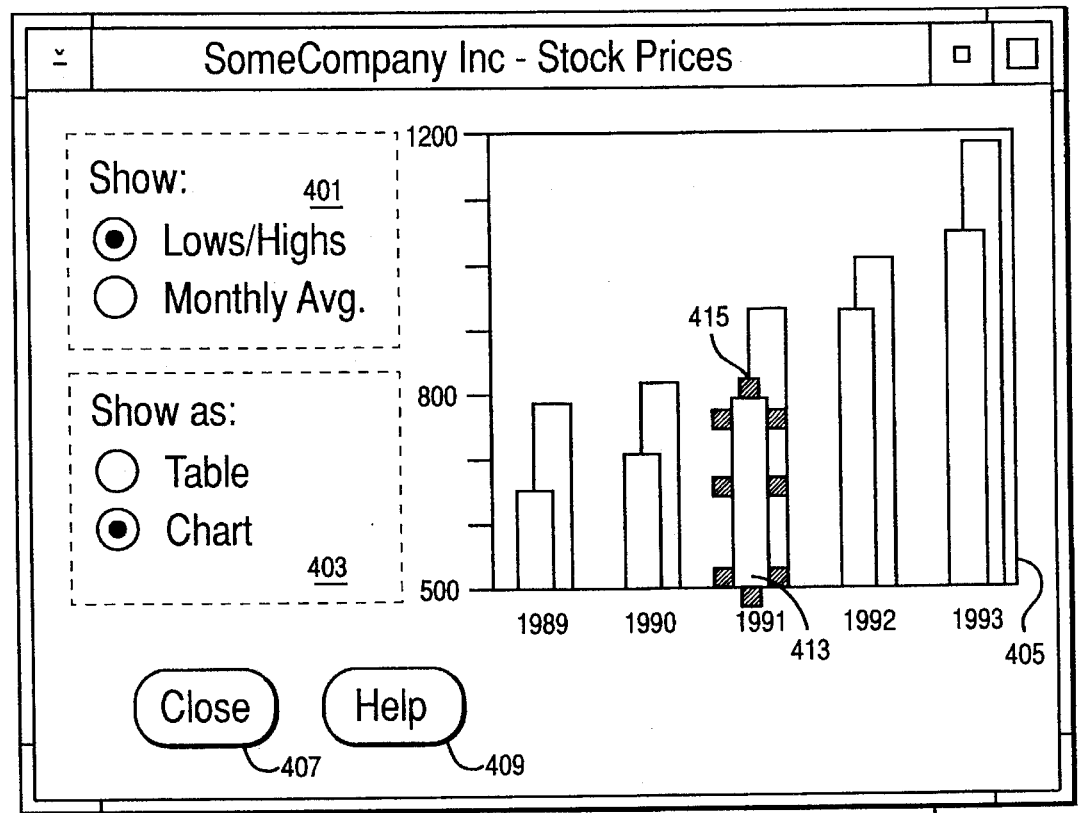

FIGS. 8A and 8B depict another example of a compound object, substituting a chart for the table to demonstrate the generality of the approach. The chart is a composite object consisting of sets of bars, where each set is associated with a year, and bars within each set indicating the magnitude of some value, the Low/High values of Some Company, Inc. stock prices in this example. In the figures, there are five main subobjects under the main window object Show radio button field, 401, Show As radio button 403, Chart 405 and Close and Help pushbuttons 407 and 409.

Figure 9:
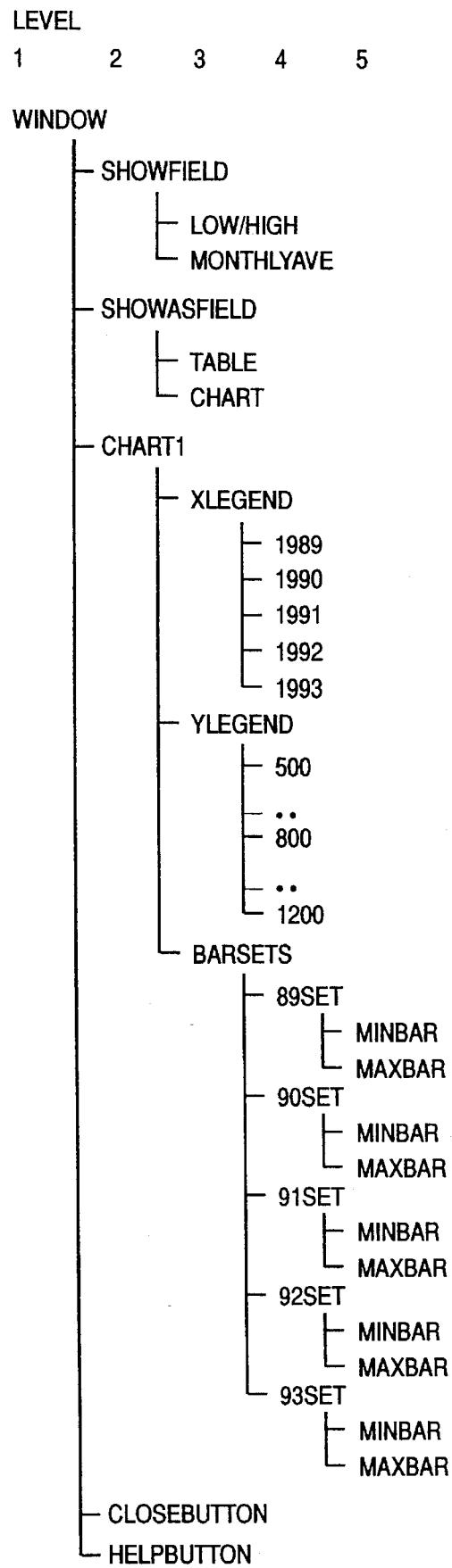
FIG. 9 depicts the compound object in FIGS. 8A and 8B in tree form.

In FIG. 8A, the chart subchoice 411 is shown in reverse video as it is the currently selected object. Chart 411 could be selected, for example, by the user moving the mouse pointer over the item and clicking. Next, as shown in FIG. 8B, the user has moved to the third MINBAR in the chart 413, which is depicted surrounded by selection tabs 415. There are a number of ways according to the invention in which the inventor can navigate within the compound object. Perhaps the simplest is to navigate by the mouse by placing the pointer over the bar and select by clicking. Alternatively, the keyboard can be used. The user, for example, could navigate up from the chart selection to the "Show As" radio button group by pressing the UpArrow and Alt keys. Then, referring to FIG. 9, as the chart is the next object at the second level, the tab key could be pressed, then the navigation within the same level. Upon navigation to the chart, it is likely that some sort of implicit navigation to a lower level would occur. Most likely navigation would occur to the 1989 control, .i.e. using arrow up and arrow down keys to change its height, as it is suitable for keyboard input. The user would then tab across to the 1991 set and hit the down arrow and the ALT to get to the MINBAR. At this point, the user would hit the space bar to select MINBAR.

Figure 10A:
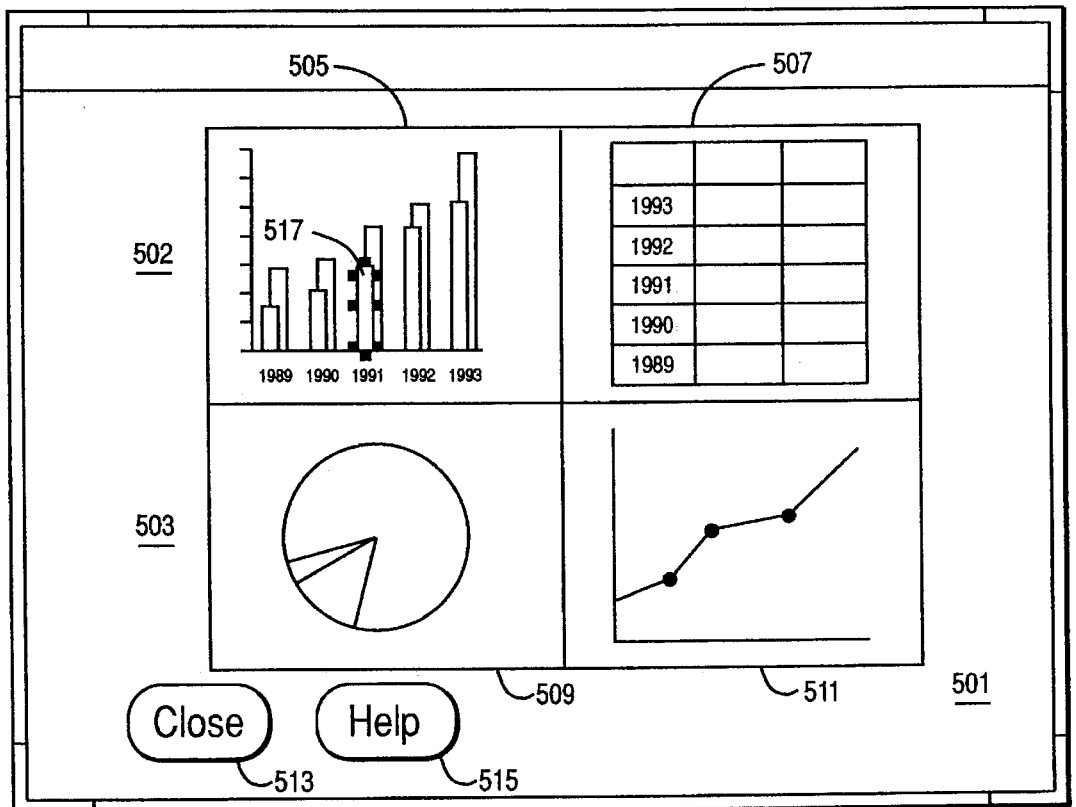
FIGS. 10A and 10B depict a compound object including a compound table and two push buttons.
Figure 10B:
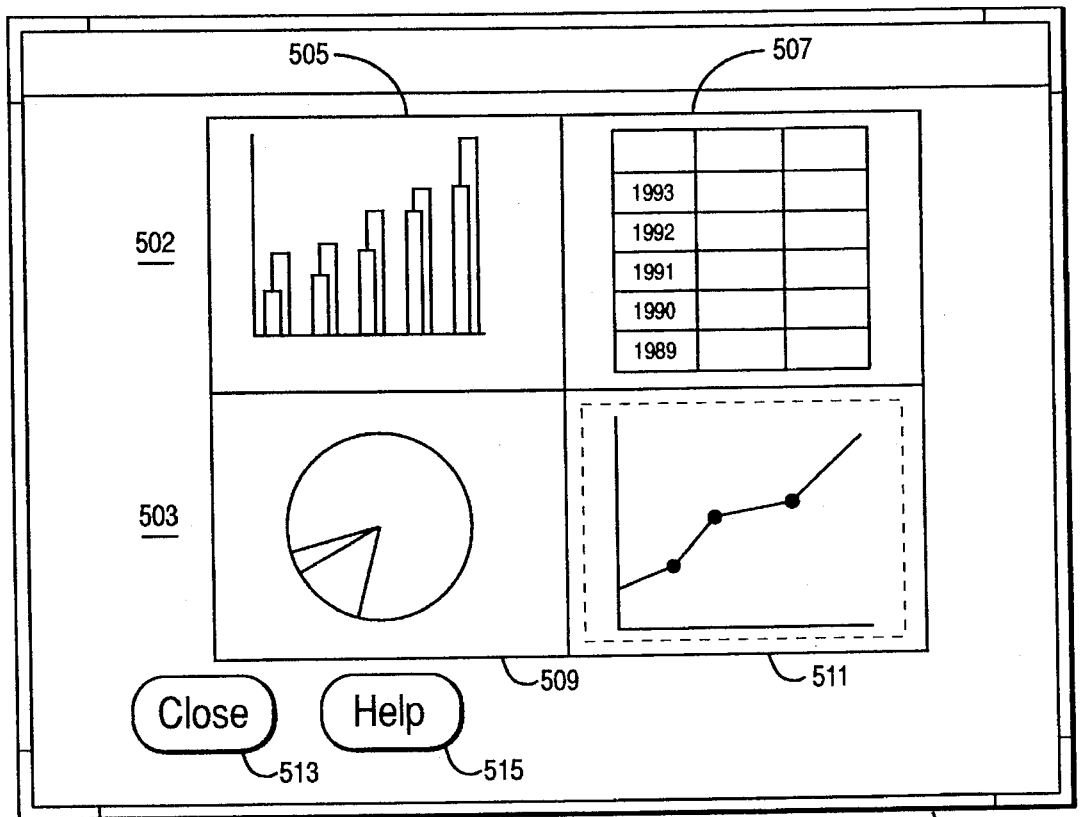
Figure 11:
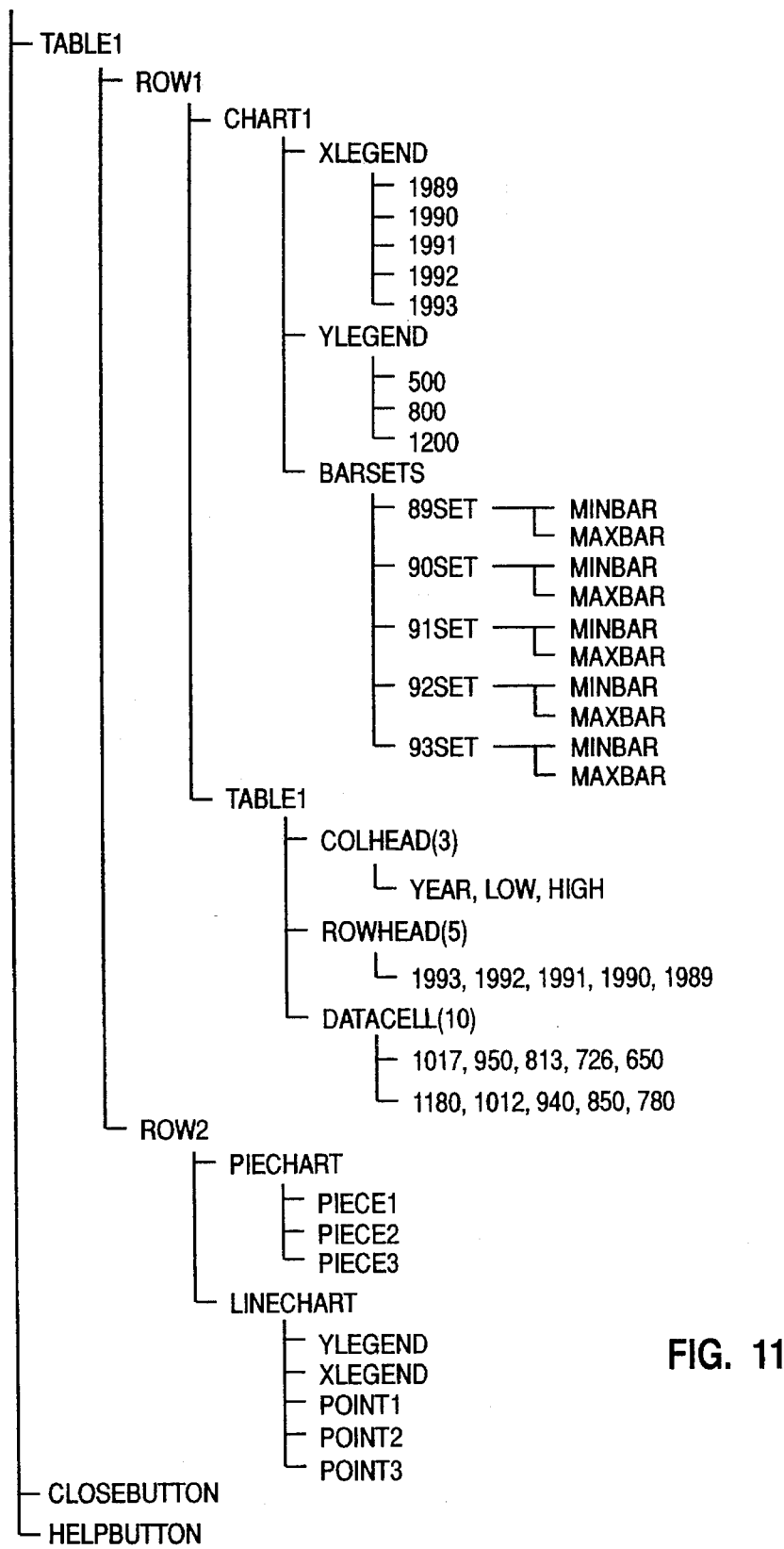
FIG. 11 depicts the compound object in FIGS. 10A and 10B in tree form.

FIGS. 10A and 10B depict yet further nested levels of composite structures to demonstrate the pervasive nature of the problem and applicability of the technique described herein as a solution. This compound object 500 includes a table 501, close button 513 and a Help button 515 at its main subobject level. Within the table 501 row objects 502 and 503 include charts 505, table 507 pie chart 509 and, histogram 511 respectively. Please refer also to FIG. 11. The chart 505 and table 507 are similar to those seen in FIGS. 8B and 3 respectively. As detailed in FIG. 11, these objects have yet further subobjects. As shown in FIG. 10A, the second MINBAR 517 in the chart 505 is selected. The user wants to select the cell 511 containing the line chart. Again, the user could move the mouse pointer to within the cell but outside any region belonging to the subobjects and click. Since the cell would be the lowest level object which is contained by the hot-spot of the mouse pointer, the cell would be selected. Alternatively, the user could press the UpArrow and ALT key combination four times to get to the row level, tab to row two, press the Down-Arrow and ALT key combination to get to the pie chart and then tab across to the line chart. This of course assumes there is not implicit navigation to a lower level more suitable for keyboard input. If the developers of a chart object have programmed implicit navigation to a lower level object suitable for keyboard control, as the user tabs to a new chart he will automatically be at the lower level object. This will entail additional keystrokes for explicit uplevel or skip level navigation to reach the line chart.

While the invention has been described with respect to the particular embodiments above, it would be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for navigating within a compound graphical object in a graphical user interface presented on a display using a pointing device or keyboard, comprising the steps of:

determining whether a first command to move user focus from a current active graphical object to a next graphical object both within the compound graphical object was issued from the keyboard;

finding a next graphical object in the same level within the compound graphical object as the current active graphical object at a current cursor position;

passing the first command to the next graphical object to determine whether the next graphical object accepts keyboard input;

responsive to a determination that the next graphical object does not accept keyboard input, passing the first command to a lower level graphical object which does accept keyboard input within the next graphical object; and making the lower level graphical object the current active graphical object in the graphical user interface to position a cursor therein.

2. The method as recited in claim 1 wherein a selection cursor is presented at a location previously selected in the lower level graphical object, if the first command was issued from the keyboard device.

3. The method as recited in claim 1 wherein a typing cursor is presented at a previously selected position in the lower level graphical object, if the first command was issued from the keyboard device.

4. The method as recited in claim 1 wherein the next graphical object is found according to both a hierarchy of graphical objects in the compound graphical object and a set of object positions within the compound graphical object.

5. The method as recited in claim 1 further comprising the step of moving user focus from the lower level graphical object to a hierarchically adjacent graphical object of the lower level graphical object in response to a switch level command from the keyboard.

6. The method as recited in claim 1 further comprising the step of:

sensing a skip level command from the keyboard; determining a skip level rule for the compound graphical object; and making a new graphical object the current active graphical object according to the skip level rule, the new graphical object a plurality of levels removed from the lowest level graphical object.

7. The method as recited in claim 1, further comprising the steps of:

a) determining that a second command to move user focus from a current active graphical object to another graphical object within the compound graphical object was issued from the pointing device;

b) passing the second command to a higher level graphical object whose allocated display space contains a hot spot of a pointer icon;

c) determining whether a child graphical object of the higher level graphical object exists whose allocated display space also contains the hot spot;

d) responsive to finding a child graphical object in step c), passing the second command from a higher level graphical object to the child graphical object;

e) repeating steps c) and d) for child graphical objects of the child graphical object until a lowest level graphical object whose display space contains the hot spot is found; and f) making the lowest level graphical object the current active graphical object in the graphical user interface.

8. The method as recited in claim 7, further comprising the steps of:

determining whether the lowest level graphical object contains text; and presenting a typing cursor at the hot spot.

9. The method as recited in claim 7 further comprising the step of removing selections throughout the compound graphical object other than selections in the lowest level graphical object.

10. The method as recited in claim 7, further comprising the steps of:

determining whether the second command is an augmented command; and presenting a selection cursor at a previously selected location in the lowest level graphical object.

11. The method as recited in claim 7, further comprising the steps of:

detecting movement of the hot spot during a selection command outside the display space allocated to the lowest level graphical object; and presenting a selection on at least a second lowest level graphical object which encompasses a path of movement of the hot spot.

12. A system for navigating within a compound graphical object in a graphical user interface presented on a display using a pointing device or keyboard comprising:

means for determining whether a first command to move user focus from a current active graphical object to a next graphical object both within the compound graphical object was issued from the keyboard;

means for finding a next graphical object in the same level within the compound graphical object as the current active graphical object at a current cursor position;

means for passing the first command to the next graphical object to determine whether the next graphical object accepts keyboard input;

means responsive to a determination that the next graphical object does not accept keyboard input for passing the first command to a lower level graphical object within the next object in the graphical user interface to position a cursor therein.

13. The system as recited in claim 12 wherein a selection cursor is presented at location previously selected in the lower level graphical object, if the first command was issued from the keyboard device.

14. The system as recited in claim 12 wherein a typing cursor is presented at a previous position in the lower level graphical object, if the first command was issued from the keyboard device.

15. The system as recited in claim 12 wherein the next graphical object is found according to both a hierarchy of objects in the compound graphical object and a set of object positions within the compound graphical object.

16. The system as recited in claim 12 further comprising means for moving user focus from the lower level graphical object to a hierarchically adjacent graphical object of the lower level graphical object in response to a switch level command from the keyboard.

17. The system as recited in claim 12 further comprising steps of:

sensing a skip level command from the keyboard;

determining a skip level rule for the compound graphical object; and making a new graphical object the current active graphical object according to the skip level rule, the new graphical object a plurality of levels removed from the lowest level graphical object.

18. The system as recited in claim 12 further comprising:

a memory coupled to a system bus for storing sets of instructions for operating the system;

a processor coupled to the system bus for executing the instructions;

a display coupled to the system bus for displaying the graphical user interface;

a keyboard coupled to the system bus for providing keyboard input to the system; and a pointing device coupled to the system bus for providing pointing device input to the system.

19. The system as recited in claim 12 further comprising:

means for determining that a second command to move user focus from a current active graphical object to another graphical object within the compound graphical object was issued from the pointing device;

means for passing the second command to a containing graphical object whose allocated display space contains a hot spot of a pointer icon;

means associated with the containing graphical object for determining whether a child containing graphical object of the containing graphical object exists whose allocated display space contains the hot spot;

means associated with the containing graphical object for passing the second command to the child containing graphical object; and means for making the child containing graphical object the current active graphical object in the graphical user interface.

20. The system as recited in claim 19, further comprising:

means for determining whether the child containing graphical object is text; and means for presenting a typing cursor at the hot spot.

21. The system as recited in claim 19 further comprising means for removing selections from any graphical object other than the child containing graphical object.

22. The system as recited in claim 19, further comprising:

means for determining whether the second command is an augmented command; and means for presenting a selection cursor at a location previously selected in the child containing graphical object.

23. The system as recited in claim 19, further comprising:

means for detecting movement of the hot spot during a selection command outside an area allocated to the child containing graphical object; and means for presenting a selection on at least a graphical object which encompasses a path of movement of the hot spot.

24. A computer program product in a computer readable memory for navigating within a compound graphical object in a graphical user interface presented on a display using a pointing device or keyboard comprising:

means for determining whether a first command to move user focus from a current active graphical object to a next graphical object both within the compound graphical object was issued from the keyboard;

means for finding a next graphical object in the same level within the compound graphical object as the current active graphical object at a current cursor position;

means for passing the first command to the next object to determine whether the next object accepts keyboard input;

means responsive to a determination that the next graphical object does not accept keyboard input for passing the first command to the cursor at a lower level graphical object which does accept keyboard input within the next graphical object means for making the lower level graphical object the current active graphical object in the graphical user interface to position a cursor therein.

25. A computer program product as recited in claim 24 comprising:

means for determining whether a second command to move user focus from a current active graphical object to another graphical object within the compound graphical object was issued from a pointing device;

means for passing the second command to a first graphical object whose allocated display area contains a hot spot of a pointer icon;

means associated with each graphical object in the compound graphical object for passing the second command to a child graphical object of the graphical object if a display area allocated to the child graphical object contains the hot spot;

means associated with each graphical object for making itself the current active graphical object if the graphical object has no child graphical object whose allocated display area contains the hot spot;

so that the lowest level graphical object whose allocated display space contains the hot spot becomes the current active graphical object in the graphical user interface.

* * * * *